Feb. 24, 1959 R. N. NOYCE 2,875,141

METHOD AND APPARATUS FOR USE IN FORMING SEMICONDUCTIVE STRUCTURES

Filed Aug. 12, 1954 2 Sheets-Sheet 1

INVENTOR.
ROBERT N. NOYCE

BY

ATTORNEY

INVENTOR.
ROBERT N. NOYCE
BY
Allen U. Hayes
ATTORNEY

United States Patent Office 2,875,141

Patented Feb. 24, 1959

2,875,141

METHOD AND APPARATUS FOR USE IN FORMING SEMICONDUCTIVE STRUCTURES

Robert N. Noyce, Elkins Park, Pa., assignor to Philco Corporation, Philadelphia, Pa., a corporation of Pennsylvania Application August 12, 1954, Serial No. 449,347

12 Claims. (Cl. 204—143)

Figures 1, 4:
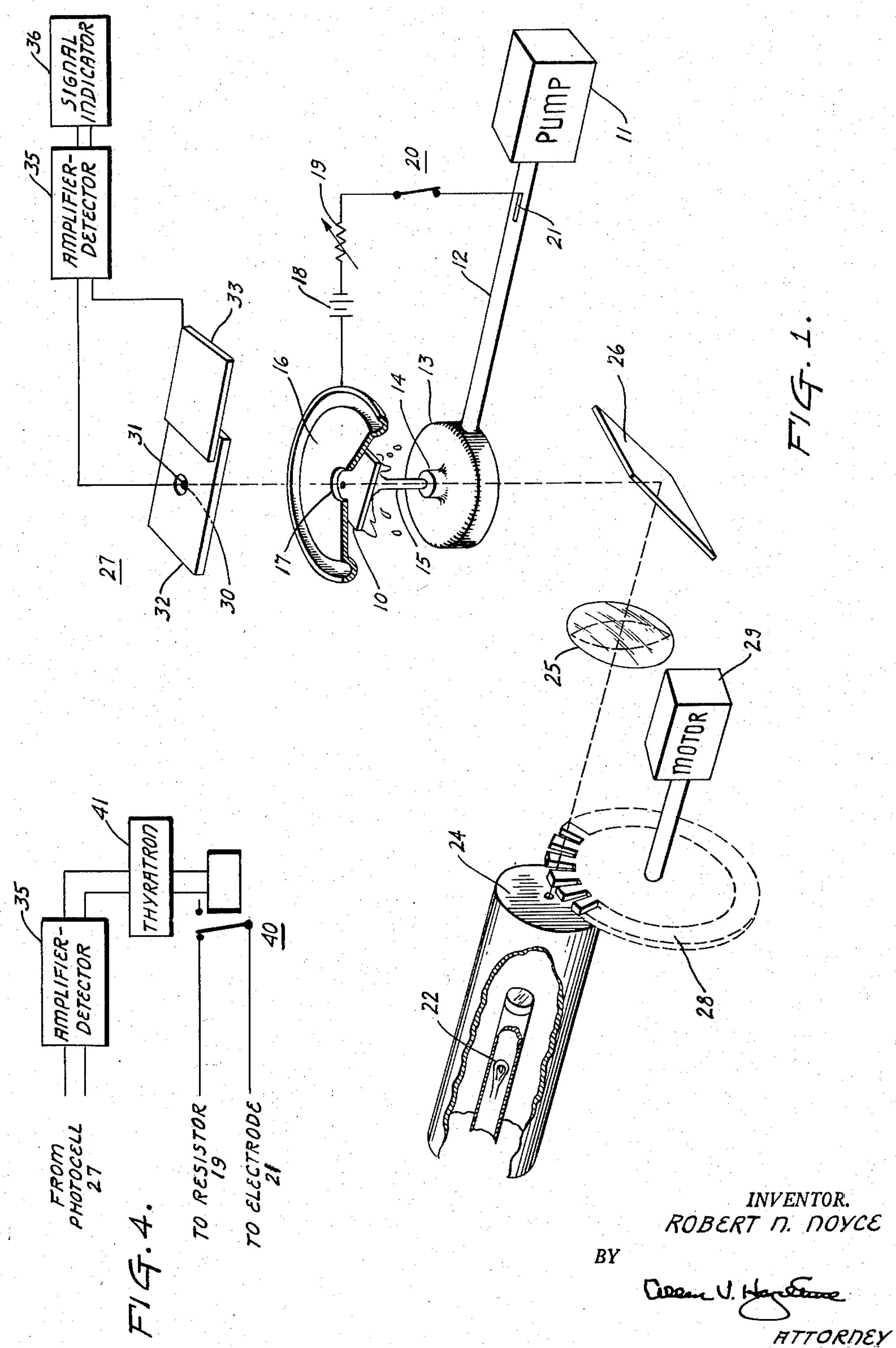

This invention relates to methods and apparatus useful in the fabrication of bodies of accurately controlled thicknesses, particularly where these bodies are to be suitable for use as the crystalline elements in semiconductive circuit devices such as transistors.

In fabricating certain semiconductive devices such as the transistor, it often becomes important to provide a body of semiconductive material, at least a portion of which is of very small, reproducible thickness, and to do so without introducing undesired stresses and strains into the semiconductive material. Thus, for example, in fabricating transistors of the surface-barrier or alloyed-junction types, it has been found that reliable high-frequency transistors may readily be obtained provided that a sufficiently thin, substantially uniform base region free of stresses and strains can be produced in a body of semiconductive material. One method for accomplishing the requisite control of base thickness is by etching a body of semiconductive material of initially uniform thickness under controlled conditions, noting the time required to produce perforation of the body, and then repeating the process at an adjacent position on the same body with the same or substantially identical equipment and operating conditions. Such a procedure is described in the copending application Serial No. 395,756 of Tiley and Williams for "Semiconductive Device and Methods for the Fabrication Thereof," filed December 2, 1953, now abandoned. While the latter process is suitable for many purposes, it is obviously desirable from the viewpoints of economy, accuracy and simplicity to provide a method for accomplishing control of the base thickness of a body of semiconductor by a method requiring but a single thickness-reducing operation and which does not rely upon exact parallelism of opposing surfaces of the body or identity of operating conditions for its accuracy. It is also desirable that the method employed be applicable without substantial change to the processing of semiconductive materials of widely differing resistivities, so that differing kinds and amounts of impurities may be employed in the semiconductive material without requiring alterations in the apparatus or procedure.

Accordingly, it is an object of my invention to provide an improved method and apparatus for producing a body of material of predetermined thickness.

Another object is to provide such a method and apparatus which are suited for the production of reproducibly small thicknesses of semiconductive materials, without requiring that the material first be provided with substantially parallel opposite surfaces.

Still another object is to provide such a method and apparatus which are simple, accurate and readily adapted for use in mass production.

It is another object to provide such a method and apparatus which are suitable for use without substantial modification upon semiconductive materials of different resistivities.

A further object is to provide a method and apparatus for progressively modifying the thickness of a semiconductive body and for altering the modifying process when a predetermined thickness is produced.

A still further object is to provide an improved method for determining the thickness of a semiconductive body.

In achieving the above objectives in accordance with one aspect of the invention, I utilize a method in which indications of the thickness of a body are obtained by applying electromagnetic radiations to the body and detecting at least some of the radiation components transmitted therethrough as the thickness is modified. The spectrum of the radiations is selected to provide components having wavelengths in the vicinity of a predetermined transmission limit of the body for the thicknesses to be determined. The wavelengths at which such transmission limits occur are functions of the thickness of the body, reductions in thickness generally corresponding to an increase of the transmission bandwidth and hence an increased separation of the short-wavelength and long-wavelength transmission limits for the band in question. The position of the selected transmission limit is therefore a criterion of the thickness of the material at any time. As the thickness of the material is modified, this transmission limit moves through the spectrum of the incident radiations, the number of radiation components transmitted by the body changes, and the strength of the detected signals changes correspondingly. Further in accordance with the invention, I then provide that detected radiation components having wavelengths in the vicinity of the transmission limit for certain thicknesses are enhanced with respect to other components in the wavelength range through which the selected transmission limit moves during the thickness-modifying process, for example by limiting the radiations incident upon the radiation-detecting device to wavelengths near the position of the transmission limit for these thicknesses, or by limiting the spectral response of the radiation-detecting device in a corresponding manner. This relative enhancement of certain components produces detected signals of readily recognizable form when predetermined values of thickness are produced and therefore results in increased accuracy of thickness measurement, for reasons which will become apparent hereinafter.

In accordance with the invention in another aspect, in a preferred embodiment thereof I utilize as the thickness-modifying agent a substance which is at least partially translucent to radiation components of the wavelengths to be detected, so that the radiations may be passed through the body even as the thickness is being changed and continuous indications of body thickness thereby substantially instantaneously obtained. With this arrangement great accuracy is attained in altering the processing of the body when the preselected thickness has been produced.

When processing semiconductive bodies in this manner, I also prefer to utilize a thickness-modifying agent which can be maintained in intimate contact with the semiconductor during the thickness modifying process and which has an index of refraction for the radiations utilized which is nearer that of the semiconductor than is that of air. Such an agent may comprise a liquid capable of etching material away from, or depositing material onto, the semiconductive body, and has the advantage of reducing the refraction of radiations passed through the body and thereby simplifying the detection of the transmitted radiations.

Further in accordance with the invention, in a preferred embodiment the liquid may be chosen to provide the desired spectrally-selective responsiveness of the measuring system referred to hereinbefore, since the liquid acts as a spectrally-selective optical filter having a passband determined in part by the length of the liquid path through which the radiations are constrained to pass therein. In addition I have found it especially advantageous to utilize a jet of liquid as the thickness-modifying agency through which the measuring radiations are passed; because of the smooth, rapid, and well-defined fluid flow pattern which the jet produces, the path of radiations through the liquid is substantially uniform at all times, and substantially free of changes in the nature or length of the liquid path such as may tend to occur, where a liquid bath is employed, due to bubble formation, evaporation or inadvertent jarring or vibration of the bath. As a result of the more uniform liquid path obtained with the jet, spurious interfering indications of non-existent thickness variations are minimized and the accuracy of measurement is increased.

Although by no means limited to such specific arrangements, the invention will be described hereinafter in detail with particular reference to the production of a thin region of semiconductive material suitable for use as the base element of a surface-barrier or alloyed-junction transistor, in the following manner. A body of etchable semiconductive material is progressively reduced in thickness by means of a jet of an electrolytic etchant impingent upon a surface thereof, while infra-red radiations are applied to the body by way of the jet. A radiation detector responsive to a predetermined range of radiation components is placed so as to be irradiated by radiations which have passed through the jet and the semiconductive body, and to produce output signals indicative of the strength of the transmitted radiations. The path length of the radiations in the electrolyte is such that the long-wavelength transmission limit of the jet is less than the long-wavelength spectrum limit of the radiations from the source and also less than the long-wavelength limit of substantial response of the radiation detector, so that the long-wavelength limit of the band of detected components is determined primarily by the spectral pass-band of the jet. The semiconductive body is of germanium having a short-wavelength transmission limit which is above the long-wavelength transmission limit of the jet at the beginning of etching, but which moves downwardly and toward the passband of the jet as the desired thickness is approached. When the etching has progressed to the point where overlap between the transmission band of the germanium and of the jet begins to occur, the output signals of the radiation detector increase markedly and in readily identifiable fashion, and may be calibrated in terms of body thickness. Upon indication of the desired thickness, etching may be discontinued manually or automatically to provide the desired thin semiconductive body region.

Figure 3:
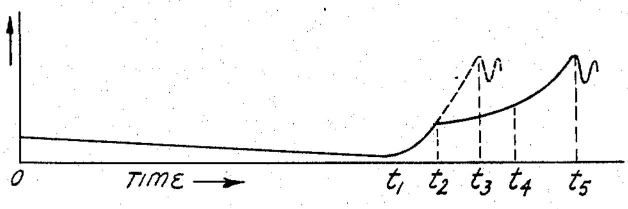

Other objects and features of the invention will be more readily appreciated from a consideration of the following detailed description, taken in connection with the accompanying drawings, in which:

Figure 1 is a diagrammatic representation, partly in perspective and partly in block form, of apparatus for practicing the method in its preferred form;

Figures 2A to 2F comprise a group of graphical representations indicating the passband characteristics of various elements of the system of Figure 1, and to which reference will be made in describing the operation and theory of the invention;

Figure 3 is a graphical illustration to which reference will be made in describing a preferred use of my method and apparatus; and Figure 4 is a diagram, partly schematic and partly in block form, illustrating a modification of the system of Figure 1 which is advantageous in certain applications.

Referring now to Figure 1 in more detail, body 10 comprises the material which is to be reduced in thickness to the prescribed small value, and when intended for use in transistor devices will have those physical and electrical properties which are well known to be necessary for such devices. As an example of a suitable material in such applications, the body 10 may be of single-crystal-line, N-type germanium, having a hole-lifetime of the order of 100 microseconds and a resistivity of the order of 5 ohm-centimeters. Although shown in the figure as being of regular form, it may be irregular and need not have its opposite surfaces even approximately parallel.

The method here illustrated for progressively modifying the thickness of the body 10 is generally similar in some aspects to that described in detail in the above-mentioned copending application of Tiley & Williams, in accordance with which a jet of electrolytic etchant is utilized to excavate a local depression in a semiconductive body. Thus, a suitable liquid pump 11 may be utilized to provide the necessary pressure for forcing an electrolyte through supply tube 12, nozzle 13 and orifice structure 14, which may all be of glass, thereby to form a well-defined jet 15 of electrolyte directed against the lower surface of body 10. Body 10 may be supported, as by soldering, from a metallic disc 16 having therein a central aperture 17. The jet 15 is directed against a surface region of body 10 directly opposite the aperture 17 in supporting disc 16, and appropriate etching potential is supplied to the electrolyte by means of potential source 18, variable series resistor 19, single-pole, single-throw switch 20 and inert electrode 21 immersed in the electrolyte as shown.

Suitable electromagnetic radiations are then applied to the area under jet 15 in the following manner. An infra-red source 22, such as a microscope lamp, generates radiations which are formed into a beam by means of diaphragm 24 and condensing lens 25 and supplied by way of a mirror 26 to the underside of nozzle 13 at a point directly opposite the orifice device 14 thereof. These radiations then pass through the nozzle 13 and thence through the jet 15 to the underside of the semiconductive body 10. As has been indicated hereinbefore, the radiations incident upon body 10 will be transmitted through the body at least to some extent as the body is made thinner, and will be detected by radiation-responsive cell 27.

For convenience in amplification and noise rejection, the light beam from source 22 may be interrupted periodically by means of disc-like light chopper 28, driven by motor 29 and having serrations therein sufficient to interrupt the light beam at a frequency, such as 750 cycles per second, which is convenient for the amplification of electrical signals derived therefrom and which lies intermediate harmonics of the usual 60-cycle line frequency so as to minimize interference from other light sources.

The radiation-responsive cell 27 is disposed with its sensitive area 30 confronting aperture 17 in disc 16 so as to be impinged by radiations transmitted through the region of body 10 under jet 15, and so as to produce an output signal varying in accordance with variations in the strength of the radiations incident thereon and lying within a prescribed band of wavelengths. Although cell 27 may take any of several well-known forms, in applications of my method to the treatment of germanium I prefer to utilize as the radiation detector a germanium surface-barrier diode comprising a metal contact 31 of zinc for example, electro-deposited upon a surface of a germanium wafer 32 opposite to, but closely spaced from, the exposed surface 30. The electrodeposited contact 31 provides a rectifying contact to wafer 32, while an ohmic connection to the wafer is supplied by soldered metal tab 33. Such a photo-diode may readily be fabricated by the general method described in detail in the above-cited application of Tiley and Williams and need not be described further herein.

The output signal from contacts 31 and 33 of light-responsive cell 27 is supplied to the input terminals of an amplifier-detector 35 and thence to a signal indicator 36 for producing indications of the amplified signals in suitable form. Amplifier-detector 35 may comprise a band-pass audio amplifier and diode detector of conventional form, while indicator 36 may suitably comprise a recording potentiometer or similar device for providing visual indications of the instantaneous values of the amplified and detected signals.

While in the interest of clarity of exposition it has not been shown, it will be understood that appropriate radiation shielding may be employed to confine the beam of radiations to substantially the dashed straight lines shown in the figure and to prevent illumination of light-responsive cell 27 by stray light which has not passed through jet 15 and semiconductive body 10. Although in some applications other conventional steps for reducing the interfering effects of stray light may be desirable, for example gating amplifier-detector 35 in synchronism with the passage of light by chopper 28, such conventional apparatus is not necessary to an understanding of the invention and therefore has not been shown.

The characteristics and mode of operation of the apparatus shown in Figure 1 will be more readily understood by referring now to the graphs of Figures 2 and 3, which are illustrative only and not intended to be quantitatively definitive of the exact relationships existing in any specific application of the invention.

As has been indicated hereinbefore the germanium of wafer 10 in the region under jet 15 where the thickness is progresssively reduced has a spectral transmittance characteristic for incident radiations which is a function of the thickness of the germanium material remaining at any time. Thus, referring to Figure 2A wherein ordinates represent the transmittance of the germanium body and abscissae represent the wavelengths of radiations incident thereon, solid curve *a* indicates a portion of the transmittance characteristic of the germanium for relatively large thicknesses of the order of 2 mils for example, which in a typical case may be the initial thickness of body 10. As shown by curve *a*, the transmittance of the relatively thick germanium is substantial for the higher wavelengths, but begins to decrease rapidly at about 1.9 microns until for radiations below about 1.7 microns wavelength the transmittance becomes negligible. Because of the finite slope of the short-wavelength end of the curve *a*, and because of the exponential dependence of transmitted light on thickness, as the thickness of the germanium wafer 10 is reduced by the electrolytic etching action of jet 15 the short-wavelength transmission limit of the germanium effectively shifts in the shorter wavelength direction as shown by broken curves *b*, *c*, *d*, *e* and *f* for example in Figure 2A, which are the corresponding transmittance curves for progressively smaller thicknesses of germanium down to 0.1 mil or less for curve *f*. Curve *e* represents the transmittance characteristic for a thickness of about 0.2 mil, which has been found suitable for the base region of surface-barrier transistors and in the present illustration will be considered as the final value of thickness desired for the germanium body.

Figure 2A:
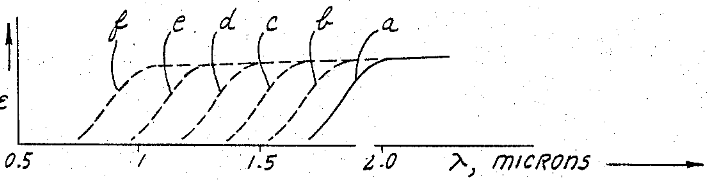
Figure 2B:
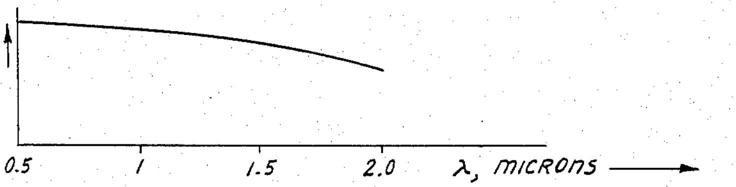

The spectrum of the infra-red source 22 includes a band of components of different wavelengths for at least some of which the transmittance of wafer 10 varies considerably for different thicknesses in the vicinity of the value ultimately desired. Stated otherwise, the source radiations include components in the vicinity of the short-wavelength transmission limit of the semiconductive material for the range of thickness to be determined. For example the spectrum of radiations from the source 22 in the range from 0.5 to 2 microns wavelength may be as shown by the graph of Figure 2B, wherein ordinates represent intensity of radiation and abscissae represent wavelength of radiation. This spectrum is seen to contain radiation components of substantial magnitude in the vicinity of the short-wavelength cut-off of curve *e* in Figure 2A, and in fact the source radiations are seen to extend throughout the range through which the short-wavelength transmission limit of the body 10 moves during the etching process.

The electrolyte in nozzle 13 and jet 15, through which the radiations from source 22 pass before reaching body 10, is characterized by a spectral transmittance characteristic of its own for incident radiations which is a function of the length of the path which the radiations traverse in the electrolyte. For example, a 0.6 centimeter length of an electrolytic etching solution comprising 0.2 normal sulphuric acid will have a spectral passband characteristic of the form exemplified in Figure 2C, which provides substantial transmittance for components having wavelengths up to about 1 micron, after which the transmittance begins to decrease until at wavelengths of about 1.35 microns or more the transmittance is negligibly small. If this path length is made longer, the long-wavelength transmission limit of the electrolyte path will effectively be shifted further into the short-wavelength region, that is to the left in Figure 2C. This transmittance characteristic is essentially that of water, and may be obtained with any of a large variety of aqueous solutions suitable for electrolytic or chemical etching. In any event the transmittance of the electrolyte may readily be determined by independent measurements of conventional nature.

Figure 2C:
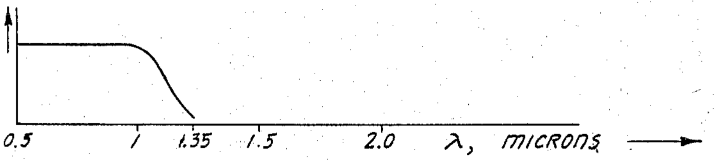
Figure 2D:
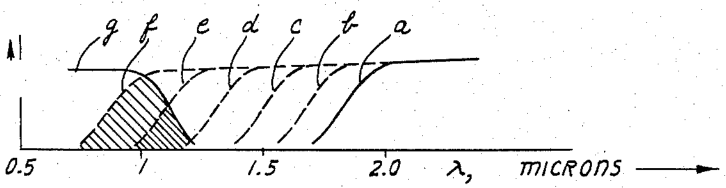

It will be appreciated that since the band of radiations incident upon nozzle 13 extends upwardly beyond the passband of the liquid path traversed by the radiations, the band of radiations actually incident upon the germanium wafer 10 is substantially that defined by the spectral characteristic of the liquid as represented generally in Figure 2C. The radiations transmitted by wafer 10 are determined by the region of overlap between the transmittance characteristic of the wafer 10 and the spectrum of the incident radiations, and hence in part by the thickness of the material. This region of overlap is shown in Figure 2D wherein the thickness-dependent passband characteristic of the wafer 10 and the bandpass characteristic of jet 15 are superimposed, the entire diagonally-hatched area indicating the components transmitted by the germanium body 10 with substantial intensity for an extremely small thickness, while the closely-hatched portion of this area indicates the magnitudes of components transmitted for a somewhat greater thickness. As will be apparent from the figure, substantially no radiations can be transmitted through germanium body 10 until the thickness thereof has been reduced sufficiently for the passband of the germanium to overlap that of the electrolyte, after which the strength of transmitted radiations increases markedly with further decreases in thickness. It is these transmitted radiations which are then caused to fall at least in part upon the sensitive portion of photocell 27.

Figure 2E:
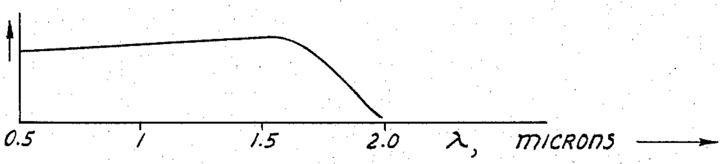

Photocell 27 also possesses a definite spectral-response characteristic which in the case of the germanium surface-barrier device illustrated may have the general form shown in Figure 2E, wherein ordinates indicate the response of the photocell to incident radiations of different wavelengths in the range of interest. In this case the photocell produces output signals of comparable magnitudes in response to radiations having wavelengths between 0.5 and 1.5 microns, and progressively smaller output signals as the wavelength is increased from 1.5 to 2 microns. Since the response of the photocell 27 as shown by Figure 2E is nearly uniform throughout the passband of the electrolyte as shown in Figure 2C, the range of wavelengths for which photocell output signals are produced is in this case limited only by the passband of the electrolyte and not by the wavelength response of the photocell. However, it will be appreciated that the range of wavelengths detected by the photocell is in general dependent on the spectral composition of the radiations generated by source 22, the passbands of the electrolyte and of the semiconductor being processed and the spectral response characteristic of the radiation detector, and if for example the response of the radiation detector provides discrimination against some radiation components incident thereon, then this response will be of importance in determining the band of radiations for which detected signals are produced.

The electrical signals generated by the photocell 27, after being amplified and detected in conventional manner, are supplied to indicator 36 in the form of a unidirectional electrical signal having an instantaneous magnitude proportional to the intensity of the radiations transmitted by wafer 10, as weighted by the response characteristic of photocell 27. The manner in which this output signal varies as a function of the time of etching in a typical case is shown in Figure 3, wherein abscissae correspond to time and ordinates correspond to signal strength supplied to the indicator. In my preferred embodiment of the invention in which indicator 36 comprises a conventional recording potentiometer, the graph of Figure 3 is in fact substantially the same as the indication provided by the indicator.

As will be seen from Figure 3, the output signal is initially small, since at large thicknesses the selective transmittance of body 10 attenuates greatly any components passed by the electrolyte, as will be apparent from the relative positions of curves *a* and *g* in Figure 2D. Typically the output signal actually decreases for a considerable time after the initiation of etching, this decrease being attributed to the fact that the jet produces a curved-bottomed depression in the germanium such that refraction and internal reflections prevent more and more of the incident radiation from reaching the sensitive portion of the photocell as the depression becomes deeper. This gradual decrease in the output of the photocell continues from time zero to time $t_1$, at which time a marked increase in output occurs as shown in the region $t_1$ to $t_2$ for example. It is at this point that the short-wave length transmission limit of the body 10 begins to overlap appreciably the passband of the electrolyte so that more and more of the radiation components incident upon body 10 are transmitted thereby. If etching is continued at the same rate, the output signal will continue to increase rapidly as indicated by the dashed curve, until perforation of the wafer occurs at time $t_3$. However, in the interest of increased accuracy I have found it usually desirable to decrease the rate of etching, as by decreasing the etching potential, when the signal has risen to a predetermined level, with the result that the increase thereafter is more gradual as shown by the solid curve in the region from $t_2$ to $t_5$. If the etching is then allowed to continue until time $t_5$, perforation of the wafer occurs. The exact time at which perforation will occur is to some extent dependent upon jet pressure, and when making very thin membranes of germanium it is therefore often advantageous to reduce the pressure as the final thickness is approached, which may conveniently be done at the same time $t_2$ at which the etching rate is diminished.

The magnitude of the signal in the region between $t_1$ and $t_5$ is therefore a direct indication of the thickness of the material remaining under the jet, and is readily calibrated in terms of wafer thickness by stopping the etching action at several points along this curve for different wafers and measuring the thicknesses of these wafers. With such calibration, it then becomes possible to produce any desired thickness of semiconductor in the range by terminating the etching action at the proper point on the rising part of the curve of Figure 3, as at time $t_4$ for example. In the present embodiment such termination is conveniently effected by opening switch 20 when indications of the desired thickness are obtained .

Figure 2F:
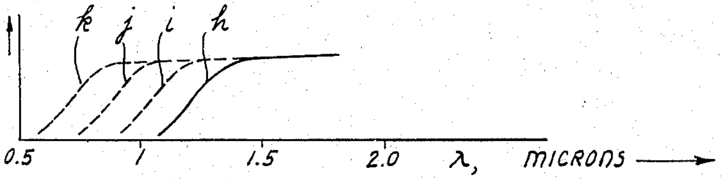

Although the invention has thus far been described with particular reference to the processing of germanium, it will be apparent that it may also be applied to other semiconductive materials such as silicon for example. Thus as is shown in Figure 2F, silicon exhibits an effective translation of its short-wavelength transmission limit toward shorter wavelengths as its thickness is decreased as does germanium. In Figure 2F, ordinates indicate the transmittance of silicon while abscissae indicate wavelengths of incident radiation, and curves *h, i, j* and *k* are the transmittance curves for bodies of silicon having thicknesses corresponding to the germanium thicknesses for curves *a, b, c* and *d* in Figure 2A. However, since the short-wavelength transmission limits occur at shorter wavelengths for silicon than for germanium of the same thicknesses, it will generally be necessary in applying the invention to silicon to restrict the detected radiation components to shorter wavelengths than in the case of germanium, as by utilizing a source limited to components of shorter wavelengths, or by using a spectral filter passing only components of shorter wavelengths, or by utilizing a radiation-detecting device responding only to incident components of shorter wavelengths. For example, the length of the jet 15 may be increased to provide the desired restriction of the incident radiations to shorter wavelengths. It will also be understood that other etching solutions such as sodium fluoride may be preferable in the case of silicon as described in the above-mentioned application of Tiley and Williams.

When utilizing the invention to provide bodies of predetermined thickness, discontinuance of the etching action may be accomplished automatically rather than manually, by means of the modification shown in Figure 4 for example. In that figure the switch 20 of Figure 1 is replaced by a relay-operated switch 40 which is normally closed to provide electrolytic etching current for jet 15, but which is opened automatically to discontinue etching when the output signal from amplifier-detector 35 rises to a value indicative of the desired thickness. To this end the output signal of amplifier-detector 35 may be supplied to a thyratron 41 or similar conventional threshold-detecting device, the thyratron being adjusted to produce current-actuation of relay-switch 40 to its open position when the signals from amplifier-detector 35 reach the value corresponding to the desired thickness of semiconductive material. Similar apparatus may also be used to change the rate of etching at any desired thickness through automatic control of the variable resistance 19.

The bases for the advantages provided by my method of thickness-measurement and control will now be more fully appreciated in view of the foregoing description. For example, it will be apparent that the method detects the production of the desired thickness of semiconductor by detecting the shift of the short-wavelength transmission limit of the semiconductive body from its initial position to a position such as that shown by curve *e* in Figure 2A. This is accomplished by detecting changes in the strength of the spectral radiations which the body transmits near this value of thickness. In the absence of the filtering effect of the electrolyte as shown in Figure 2C and of the wavelength-selective response of the radiation-detector shown in Figure 2E, the increase in detected signal produced by a shift of the transmission limit from *c* to *e* for example would provide a relatively small percentage change in the detected signal, since the detected signal would be relatively large even at the thickness corresponding to curve *c*.

However, when in accordance with the invention the detected components are limited to those having wavelengths in the vicinity of the short-wavelength transmission limit for the desired thickness, as by passing the radiations through a body of electrolyte having the passband shown in Figure 2C, then the detected signal is small until the desired thickness is approached and the percentage sensitivity of the detected signal to thickness changes in the vicinity of the desired value is therefore large. Accordingly the occurrence of the desired thickness is readily and accurately detectable, as will be apparent from the graph of Figure 3. It will also be understood that the detected radiation components need not in all applications be restricted to the band shown in Figure 2C, but that some of the advantages of the invention in this respect may be realized so long as there is discrimination against some of the components in the band between the short-wavelength transmission limit for the original thickness and for the final thickness.

Further consideration of Figure 3 will indicate another advantage of the invention, namely that since substantially continuous and instantaneous indications of the thickness of the semiconductive body are provided, it is not necessary to depend upon absolute measurements of voltage or current, and critical adjustments and precision components are therefore not necessary. The output signal as shown in Figure 3 has an easily recognizable general form, and it is only necessary to observe the curve as it is generated, and particularly its rate of rise, to determine when the proper thickness has been produced. For example, in Figure 3 it is apparent that the proper time for terminating etching can readily be determined by mere inspection of the curve even if the D.-C. component of the signal, which is largely due to electrical noise and spurious signals, were to change slowly due to thermal drift in the values of the circuit parameters of amplifier-detector 35 for example.

Although I have described the invention with reference to a system in which the jet provides a filter on the side of the germanium wafer nearest the source of radiation, a similar effect may be obtained by placing the jet on the opposite side of the wafer, and in fact the limiting of the band of detected components may be effected by one or more devices located anywhere in the system between the source of illumination and the output of the photocell 27, including the photocell itself which may embody such a low pass filter characteristic due to its inherent response characteristic.

As an example, a jet and transparent nozzle of the type described hereinabove may be utilized on each side of the wafer, in which case the filter characteristic of interest is that of the two jets and nozzles in series.

While for the purposes of clarity and definiteness of explanation the invention has been described with particular reference to a specific embodiment thereof, it will be understood that it may be embodied in any of a large variety of forms without departing from the spirit thereof. For example, the invention is applicable to cases in which the body is modified by increasing, rather than decreasing, its thickness as by plating germanium out of solution for example. In this case the output signal decreased markedly in the region of interest, and may still be calibrated in terms of thickness. Similarly in some instances one may employ the position of a long-wavelength transmission limit of a material, rather than that of a short-wavelength transmission limit, as an indication of thickness in which case the radiations supplied to the body should contain components in the range through which the long-wavelength transmission limit moves during the thickness-modifying process, and discrimination against some components in this range should also be provided. For example, it will be appreciated that by using a body 10 of material having known and fixed dimensions, the method and apparatus of Figure 1 may be utilized to permit adjustment of the length of jet 15 to a desired value by opening switch 20 to prevent etching and observing the variations in indication produced by changing the distance of nozzle 13 from body 10. These variations are due to changes in the position of the long-wavelength transmission limit of the electrolyte path, and hence comprise the desired indications of the length of the jet 15.

I claim:

1. In a method for producing a body of semi-conductive material at least a portion of which is of a desired thickness, the steps of: etching said body portion with an etchant at least partially translucent to light components having a first set of wavelengths; simultaneously passing light components having said first set of wavelengths through said body and said etchant; deriving indications of the combined strengths of those of said light components transmitted by said body and lying within a predetermined band; and modifying said etching upon the occurrence of a characteristic change in said indications.

2. The method of claim 1, in which said etchant provides a spectral passband including wavelengths in the vicinity of the short-wavelength transmission limit of said material for said desired thickness, but which attenuates substantially light components of slightly longer wavelength.

3. The method of claim 1, in which said etching step comprises directing a jet of etchant against said body portion, and in which said light components are passed through said jet.

4. The method of claim 1, in which said etchant is an aqueous solution having an index of refraction for said light which is nearer to that of said material than is that of air.

5. The method of claim 1, in which said characteristic change corresponds to an increase in the rate of change of said combined strengths of said transmitted components.

6. A method for controlling the treatment of a body of crystalline germanium when at least a portion thereof is of a desired small thickness, comprising the steps of: generating light containing components of which said germanium is transmissive at least for said desired thickness; simultaneously directing against said body portion a jet of an etchant at least partially translucent to said light components; applying said light to said body portion by way of said jet, whereby at least some of said light components are transmitted through said body portion as said desired thickness is approached; deriving indications of the combined strengths of at least some of said transmitted components; and modifying the treatment of said body portion upon the occurrence of a characteristic change in said derived indications.

7. A method for producing a region of desired thickness in a body of semiconductive material, said material having an initial thickness greater than said desired thickness and an initial short-wavelength transmission limit for light radiations corresponding to said initial thickness, the short-wavelength transmission limit for said desired thickness being less than said initial short-wavelength transmission limit, said method comprising the steps of: applying an etchant to said region of said body progressively to reduce the thickness thereof; simultaneously transmitting light radiations through said body and through a path of preselected length in said etchant, said radiations including components in the vicinity of said short-wavelength limit for said desired thickness and said path length in said etchant providing a passband having a long-wavelength transmission limit above the wavelengths of at least some components of said radiations; deriving indications of the combined strengths of at least some of said transmitted components having wavelengths shorter than said initial short-wavelength transmission limit and longer than said short-wavelength limit for said predetermined thickness; and modifying said etching operation upon the occurrence of a characteristic change in the strength of said derived indications.

8. Apparatus for providing substantially instantaneous indications of the thickness of at least a portion of a body of semiconductive material, comprising: means for etching said body progressively to reduce the thickness of a region thereof; means disposed on a first side of said region for transmitting through said body and through said etchant light radiations having wavelengths in a passband common to both said etchant and said material; and means disposed on the side of said region opposite said first side so as to be impinged by said transmitted radiations for deriving indications of the combined strengths of at least some of said transmitted light components.

9. Apparatus for producing a desired thickness in at least a portion of a body of etchable semiconductive material of thickness initially greater than said desired value, said material having a short-wavelength transmission limit for light radiations which varies in position depending upon the thickness thereof, said apparatus comprising: means for directing against said body portion a jet of a liquid which is an etchant for said material, thereby progressively to reduce the thickness of said body portion, said liquid having a long-wavelength transmission limit dependent upon the path length of radiations therein; means disposed on a first side of said body portion for applying light radiations to said body by way of said liquid, the path length of said radiations in said liquid being such as to provide a long-wavelength transmission limit lower than said short-wavelength transmission limit for said initial thickness, said radiations containing components intermediate said short-wavelength transmission limit for said initial thickness and that for said desired thickness; means disposed on the side of said body portion opposite said first side so as to be impinged by said transmitted radiations for deriving signals indicative of the combined strength of at least some of those of said radiations transmitted by both said body portion and said liquid; and means responsive to said derived signals for discontinuing said etching operation when said signals are of a level corresponding to said desired thickness.

10. In a method for providing a body of semiconductive material at least a portion of which is of a desired thickness, said material having a transmission limit for light radiations which changes its position in response to changes in thickness of said body, the step of: applying, to at least a portion of a body of said material of an original thickness differing from said desired thickness, a thickness-modifying agency effective to modify said thickness progressively and continuously in a direction to approach said predetermined thickness, said thickness modifying being effective to cause said transmission limit of said body portion to change progressively from a first wavelength characteristic of said original thickness to a second wavelength characteristic of said desired thickness, said agency being characterized by substantial translucence for light radiations throughout a band including said second wavelength; simultaneously with said thickness modifying, transmitting through said body portion and said agency, light radiations containing components having wavelengths throughout a band including said second wavelength; producing enhanced indications of the combined strengths of those of said radiations transmitted by said body portion and by said agency which have substantially said second wavelength; and altering said thickness modification upon the occurrence of said enhanced indications.

11. A method in accordance with claim 10, in which said enhanced indications are produced by transmitting said radiations through a spectrally selective element which selectively attenuates those radiation components having wavelengths in the band traversed by said transmission limit prior to the attainment of substantially said desired thickness in said body portion, whereby a readily identifiable change in said indications is produced upon the attainment of said desired thickness.

12. The method of measuring the thickness of a region of a body of semiconductive material, comprising developing light radiations, applying to said region a jet of liquid translucent to at least some of said light radiations, transmitting said radiations through said jet and said body region in sequence, and detecting the combined strengths of at least some of said transmitted components.

References Cited in the file of this patent

UNITED STATES PATENTS

| | | |
|---|---|---|
| 1,882,962 | Sawford | Oct. 18, 1932 |
| 2,044,131 | Staege | June 16, 1936 |
| 2,361,217 | Lewis | Oct. 24, 1944 |
| 2,472,605 | McRae et al. | June 7, 1949 |
| 2,644,852 | Dunlap | July 7, 1953 |

OTHER REFERENCES

Tiley et al.: "Proceedings of the I. R. E." Dec. 1953, vol. 41 No. 12, pp. 1706–1708.